United States Patent

MacPhee et al.

Patent Number: 5,223,135
Date of Patent: Jun. 29, 1993

[54] SWIMMING POOL CLEANER

[76] Inventors: Lawrence P. MacPhee, 10 Nautilus Dr., Leonardo, N.J. 07734; Patricia M. Dunnington, P.O. Box 479, Gladstone, N.J. 07934

[21] Appl. No.: 715,969

[22] Filed: Jun. 17, 1991

[51] Int. Cl.⁵ ............................................. B01D 29/07
[52] U.S. Cl. ...................... 210/242.1; 210/416.2; 210/470; 4/490; 15/1.7; 405/63; 405/64; 405/72
[58] Field of Search ................. 210/241, 169, 242.1, 210/416.2, 464, 470, 471, 495, 499; 4/490; 15/1.7; 405/63, 64, 72

[56] References Cited

U.S. PATENT DOCUMENTS

| | | | |
|---|---|---|---|
| 3,188,668 | 6/1965 | Buckelew | 15/1.7 |
| 3,369,664 | 2/1968 | Dahan | 210/242.1 |
| 3,653,215 | 4/1972 | Crucet | 210/242.1 |
| 3,979,146 | 9/1976 | Berg | 15/1.7 |
| 4,053,412 | 10/1977 | Stix | 210/169 |
| 4,089,074 | 5/1978 | Sermons | 4/172 |
| 4,247,216 | 1/1981 | Pansini | 403/109 |
| 4,300,856 | 11/1981 | Magoon et al. | 405/66 |
| 4,369,109 | 1/1983 | Edge | 210/169 |
| 4,472,842 | 9/1984 | Jarrett | 4/490 |
| 4,518,495 | 5/1985 | Harding | 210/169 |
| 4,693,031 | 9/1987 | Koetje | 43/44.91 |
| 4,888,842 | 12/1989 | McKamey et al. | 15/1.7 |
| 4,889,622 | 12/1989 | Newcombe-Bond | 210/169 |
| 5,085,767 | 2/1992 | Beers | 210/242.1 |

Primary Examiner—Robert A. Dawson
Assistant Examiner—W. L. Millard
Attorney, Agent, or Firm—Fisher, Christen & Sabol

[57] ABSTRACT

A net for removing debris is mounted on a frame which is extendable across the width of a swimming pool. The frame has a rounded or ball-type element at each lower end which rotates about an axis to facilitate travel and to protect the swimming pool surfaces from damage as the swimming pool cleaning device is moved through the water during a cleaning operation. Handles are provided for pulling the net through the water by persons on opposing sides of the pool. The pool may be cleaned in a single pass across the length of the pool. The net may be completely or partially rolled up about at least one of the side members of the frame.

20 Claims, 1 Drawing Sheet

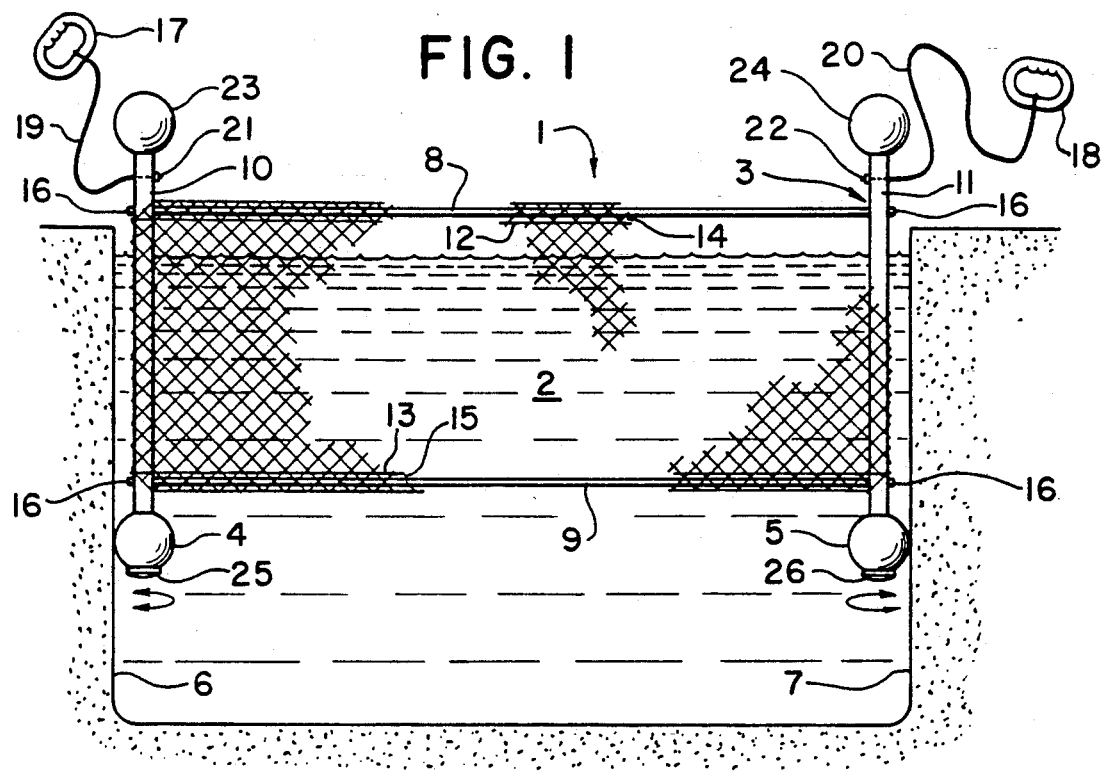
FIG. 1
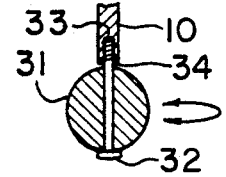
FIG. 3
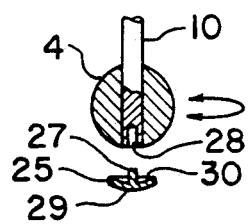
FIG. 4
FIG. 2
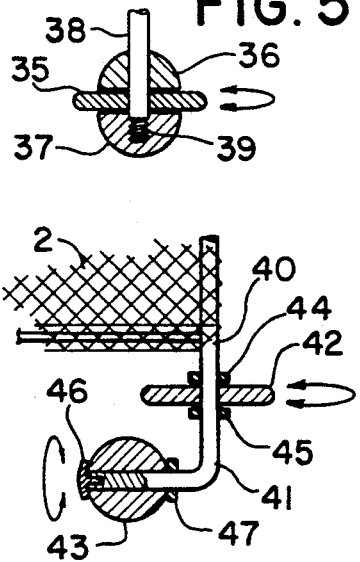
FIG. 5
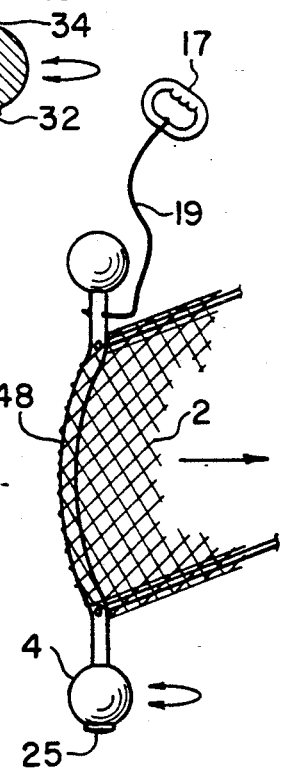
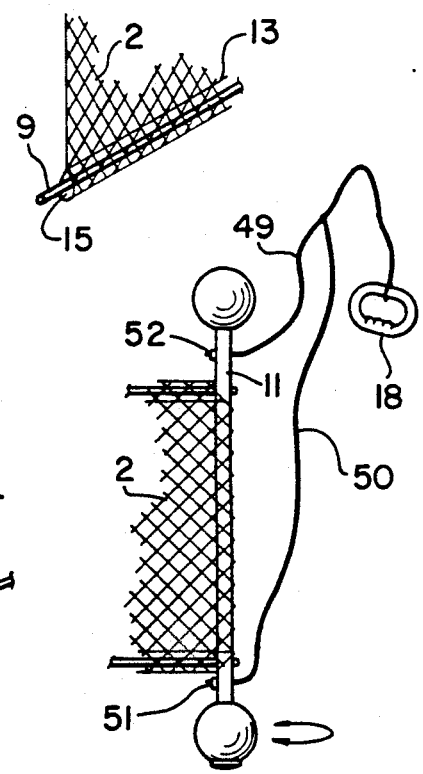
FIG. 6  FIG. 7  FIG. 8

SWIMMING POOL CLEANER

FIELD OF THE INVENTION

The present invention relates to a portable device for removing floating and submerged debris, such as leaves, from swimming pools.

BACKGROUND OF THE INVENTION

U.S. Pat. No. 4,247,216 to Pansini discloses a quick connect handle for swimming pool cleaning tools. A pole with a net at one end provides an economical, simple means for removing leaves from a swimming pool. However, the net's small area, generally about one to two square feet, necessitates many manipulations to clean a swimming pool of floating and submerged debris, such as leaves. To clean a swimming pool which is about 20 ft. by 50 ft., for example, it may take about an hour to complete the operation.

Providing a larger net increases its weight and increases the difficulty of moving it through the water. A stationary net, which collects debris by moving water through it by means of a pump, generally requires a prolonged operating period, detracts from the appearance of a pool, and reduces its usable area.

To remove both surface or floating debris and submerged debris, a large net should be lightweight and be capable of maintaining a substantially vertical orientation while it is moved through the water. In addition, its structure should be such so as to avoid damage to the pool walls and floor as it is moved through the water during a cleaning operation. This is particularly important when cleaning liner pools. The walls of these pools are often made of relatively thin plastic which can be easily punctured, causing leakage.

U.S. Pat. No. 4,693,031 to Koetje discloses a connector for quickly and securely interconnecting a fishing net to one or more support lines. A plurality of connectors are employed to form a gilled net assembly or shackle. The shackle includes a net or webbing supported as a vertical curtain in the water between an overhead float line and an underlying weight line. The net can be composed of braided monofilament nylon or other plastic or synthetic materials. A plurality of floats are spaced along the length of the float line. They may be composed of cork, foam or other suitable types of buoyant materials. A plurality of weights, composed of lead or other suitable types of material, are spaced apart across the length of the weight line. Use of the net for pool cleaning is not disclosed.

U.S. Pat. Nos. 4,053,412 to Stix, 4,080,074 to Sermons, 4,247,216 to Pansini, 4,300,856 to Magoon et al, 4,369,109 to Edge, 4,472,842 to Jarrett and 4,518,495 to Harding relate to swimming pool or water surface cleaning devices.

U.S. Pat. No. 4,053,412 to Stix discloses a collecting device for a swimming pool which has a floating support which includes buoyant side members which are held in spaced-apart relation by spacers. The spacers are light in weight and preferably are hollow tubes of lightweight plastic. A flexible net is dimensioned to fit within the open space defined by the floating support. The frame of the net fits between the faces of the side members. The frame is preferably made from relatively rigid light-weight rod, tube strips, or bars or a combination of them. Lengths of cord have their inner ends secured to the spacers of the floating support. The outer ends of the cord are secured to one or more weights (not shown) which rests upon the top of the sidewall of the swimming pool. The floating support is secured in position adjacent the side wall. The floating support holds the leading edge of the net below the surface of a circulating body of water in the swimming pool. The trailing edge of the net is held above the surface so objects which are floating on and moving with the body of water will move into and be held by the net. The opposing ends of the net do not travel through the water to clean it.

U.S. Pat. No. 4,080,074 to Sermons discloses a leaf and other debris skimmer which is disposed in a swimming pool. It is tethered by a weight to a side portion of the pool. The skimmer comprises a floating member having attached thereto a net which passes below the floating member to collect leaves, twigs, branches, grass, and other debris before they have time to settle to the bottom of the pool. The floating member is placed adjacent a drain of the filtering system of the pool so as to be in a current which moves the debris into the net.

U.S. Pat. No. 4,300,856 to Magoon et al discloses a compactible, foldable, floatable boom-fence for quickly controlling the spread of contaminants over water surfaces. Each planar rectangular fence panel has foam floats on both sides to provide flotation. Generally, the panels are made of sheet metal to provide the ballast along with a cable.

U.S. Pat. No. 4,369,109 to Edge discloses a net which is mounted on a frame for cleaning floating debris from the surface of a swimming pool. The frame is removably attached to a side portion of the pool and extends outwardly into the liquid within the pool. Debris is collected by causing liquid in the pool to flow through the net while the net is in a fixed position.

U.S. Pat. No. 4,472,842 to Jarrett discloses a pool skimmer having an elongated floating barrier. The barrier is constructed of a plurality of rigid elongated floats covered by flexible netting which forms segments which make up the floating barrier. The barrier conforms to the shape of the pool but is fixed at one end to the wall. The segments have weights, typically strips of metallic lead, to ballast the skimming tube. When the barrier is floated on the pool surface by the floats, the sides extend upwardly and downwardly.

U.S. Pat. No. 4,518,495 to Harding discloses a pool skimmer which may be used to remove leaves, grass, and insects that are on the surface of a swimming pool. The pool skimmer consists of a pair of floats separated by an oblong open framework on which the open end of a net is mounted. A harness is attached to the floats at one end and to a pole at its other end. The pole is used to pull the pool skimmer along the surface of the water.

The present invention provides an inexpensive, lightweight pool cleaning device for quickly removing floating and submerged debris in a single pass through the pool. The device is adaptable to the shape of a pool and is neither attached to nor stored in the pool. During a pool cleaning operation, the device is moved through the water and may contact the sides of the pool without damaging plastic liners.

SUMMARY OF THE INVENTION

The swimming pool cleaning device of the present invention comprises a net mounted on a frame which extends across the width of a swimming pool. The bottom portion of the frame is weighted so as to maintain the net in a substantially vertical and submerged position while it is dragged across the length of the pool to remove leaves and other floating or submerged debris. The frame has a rounded or ball type element at each lower end which rotates about an axis to facilitate travel and to protect liner pools. The frame has floatable handles for pulling the net through the water.

BRIEF DESCRIPTION OF THE DRAWINGS

FIG. 1 is a cross-sectional view of a swimming pool containing a swimming pool cleaner for removing debris from the swimming pool in accordance with the present invention.

FIG. 2 is a partial perspective view showing mounting of the net upon the lower portion of a frame in accordance with the present invention.

FIG. 3 is a cross-sectional view of a rounded element which is rotatable about a side member of the frame of FIG. 1.

FIG. 4 is a cross-sectional view of a rounded element which is rotatable about a vertical axis and which is attached to a side member of the frame of FIG. 1 by means of a bolt-like element.

FIG. 5 is a cross-sectional view of an embodiment of the present invention wherein a disc is rotatably mounted to the bottom of the side member of the frame of FIG. 1.

FIG. 6 is a partial sectional view showing the use of both a rounded element which is rotatable about a horizontal axis and a rounded element which is rotatable about a vertical axis.

FIG. 7 is a partial perspective view of a swimming pool cleaning device wherein the said members of the frame are curved so as to provide a pocket-like configuration to a net.

FIG. 8 is a partial view of a swimming pool device as shown in FIG. 1 which contains a handle attached to both the upper and lower portions of the frame.

DETAILED DESCRIPTION OF THE INVENTION

The swimming pool cleaner 1 of the present invention, as shown in FIG. 1, comprises a net 2 which is mounted upon a frame 3 which contains rounded elements 4, 5 which can rotate about an axis upon contacting a wall 6, 7 of the swimming pool. The use of rounded element 4, 5 which are rotatably mounted to a frame 3 facilitates travel of the net 2 through the water and protects the pool walls 6, 7 from damage by the frame 3.

The net 2 may be made of plastic, such as polyvinyl chloride or polymesh. The net 2 may be made from clear or colored plastic sheets or from cords. Plastic sheeting is preferred because of its low cost. The plastic sheeting may have a thickness of, for example, from about ⅛ inch to about 3/16 of an inch.

The frame 3 upon which the net 2 or mesh is mounted may comprise upper 8 and lower 9 substantially horizontal members and first and second substantially vertical side members 10, 11. The upper and lower members 8, 9 may be connected directly to the side members 10, 11 by tying, bolting, screwable caps, ball and socket type joints, and other known fastening means. The upper and lower frame members 8, 9 may also be indirectly connected to the side members 10, 11 or poles by means of the net 2.

In the embodiment shown in FIG. 1, the net 2 is made of a clear plastic meshed flexible sheet. The top edge of the sheet and the bottom edge of the sheet are folded and adhered to the sheet along top and bottom seam lines 12, 13 to provide a passageway 14, 15 through which the upper and lower support 8, 9 are inserted as shown in FIGS. 1 and 2. The seam lines 12, 13 may be formed by fusing, stitching, adhesives, and stapling, for example. The upper and lower frame member 8, 9 may be inserted through holes (not shown) in the side member 10, 11. The ends of the upper and lower members 12, 13 may then be knotted or capped with a cap 16 to connect them to the side members 10, 11 as shown in FIG. 1. The end caps 16 may comprise a clampable or compressible sleeve-like member.

The net 2 may be attached to the side member 10, 11 by stapling, fusing, adhesives, or stitching, for example. The attachment, or mounting, of the net to the side members may be accomplished by forming a passageway along the side edges of the net 2 in manner as described for the top and bottom edges of the net 2 and, as illustrated in FIG. 2. Attachment of mounting of the net 2 onto frame members 8, 9, 10, 11 may also be achieved by inserting each of the members 8, 9, 10, 11 through a plurality of openings in the net 2.

The side members or poles 10, 11 upon which the net 2 is mounted are preferably made of a rigid, hard, strong plastic so as to maintain the net in an open or unfolded configuration as it is moved through the water during a cleaning operation.

The top and bottom frame members 8, 9 may be made from plastic, such as nylon rope, cord or rope, metallic wire, or cable and the like. The bottom cord 9 is preferably heavier than the top cord 8 so as to assist in maintaining the net 2 in a substantially vertical position as it is moved through the water during a cleaning operation as shown in FIG. 1. The bottom cord 9 is preferably made of flexible, plastic-coated cable. The top frame member or cord 8 may be buoyant and is preferably a strong, flexible plastic material.

The use of flexible upper and lower frame members 8, 9 and a flexible net 2 permits wrapping or scrolling of the net about either or both of the rigid side members or poles 10, 11. This scrolling feature permits adjustment of the length of the pool cleaner 1 to conform to the widths of different pools or different widths within the same pool. Thus, the length and flexibility of the net 2 and of the frame 3 are such that they can conform to a swimming pool's dimension in a direction perpendicular to the direction of travel of the net 2 through the water. Debris, such as leaves, grass clippings, twigs, and the like, may accordingly be collected across at least substantially the width of the pool in a single pass of its length.

As shown in FIG. 1, handles 17, 18 may be attached via rope or strings 19, 20 to the top portion of each vertical side member 10, 11. The strings 19, 20 may be secured to the frame 3 by passing each string 19, 20 through a hole (not shown) in the frame 3 and tying the free ends to form knots 21, 22. The handles 17, 18 may be ring-like elements or ball-shaped, for example. They are preferably buoyant so they may be easily recovered if accidentally dropped into the pool.

The side member 10, 11 preferably have buoyant members 23, 24, such as balls removably attached to their tops. The upper buoyant members 23, 24 may be attached to the side members 10, 11 by a compression fit or by a thread and screw arrangement. These buoyant members 23, 24 may serve to keep the net 2 afloat in case the cleaner is accidentally dropped into the pool. In embodiments of the present invention, the string 19, 20 and handle 17, 18 arrangements may be eliminated. In such embodiments, the handles 17, 18 may be directly attached to the side members 10, 11. For example, the buoyant spheres 23, 24 shown in FIG. 1 may serve as handles as well as floatation means.

The rounded elements 4, 5 which are rotatably mounted to the frame 3, for example, may be spherical or ball-shaped, cylindrically-shaped, or disc-shaped. Ball-shaped rotatable elements are preferred. The swimming pool cleaner 1 of the present invention need not to be operated so that one or both of the rounded elements 4, 5 contact the side walls 6, 7 during a pool cleaning operation. However, if they do contact the side walls 6, 7 they will prevent the remaining portion of the cleaning device from contacting the side walls 6, 7 because they extend past the frame. Also, upon contacting the side walls 6, 7, they will rotate to avoid damage to the side walls 6, 7 by scraping or puncturing. Rotation of the rounded elements about vertical axes is shown in FIGS. 1, 3, 4, 5, 6, 7, and 8 by double-headed arrows. Rotation about a horizontal axis is also shown in FIG. 6.

The rotatable elements 4, 5 are preferably solid and of sufficient weight so as to maintain a substantial portion of the net 2 in a submerged position while it is moved through water during a pool cleaning operation. Preferably, the weight of the rotatably mounted round elements 4, 5 and the weight of the lower frame member 9 are sufficient to maintain the net 2 in a substantially vertical position as it is moved through water.

As shown in the embodiments of FIGS. 1 and 3, the rounded elements 4, 5 may rotate about the side members or poles 10, 11. The rotatable elements 4, 5 may be prevented from falling off of the poles 10, 11 by means of caps 25, 26 as shown in FIGS. 1 and 3. In the embodiment of FIG. 3, the cap 25 contains a projection 27 which is retained within a hole 28 in the end of the side member 10. Retention may be achieved by a compression fit or by a screw and thread arrangement. Preferably, the exterior surface 29 of the cap 25 is rounded to avoid possible damage to the bottom of the pool. The inner surface 30 of the cap 25, facing the rotatable element 4, may be contoured to the surface of the rotatable element 4.

In the embodiment of FIG. 4, the rotatable element 31 rotates about a bolt-like element 32 which is inserted into the end of the side member 10. The bolt-like element or axle 32 may be screwed into or compression fit into the hole 33 in the side member 10. In FIG. 4, the bottom 34 of the side member 10 prevents upward movement of the rotatable element 31.

In the embodiment of FIG. 5, a rotatable disc-like element 35 is sandwiched between upper 36 and lower 37 disc-retaining elements. The rotating disc 35 has a diameter which is greater than the diameters of each of the upper and lower retaining elements 36, 37. The lower retaining element 37 may be secured to the frame side member 38 by a compression fit or by screwing. In FIG. 5, the end of the side member 38 is provided with external threads 39 upon which the cap or lower retaining element 37 may be screwed.

In the embodiment of FIG. 6, the side member 40 is provided with an L-shaped portion 41 (shown in cross section) for carrying both: 1) a rounded element 42 which is rotatable about a vertical axis, and 2) a rounded element 43 which is rotatable about a horizontal axis. Rotation about each axis is shown by double headed arrows. The L-shaped portion 41 may be integral with or be removable from the side member 40. In the embodiment of FIG. 6, rotatable elements are thus provided for contact with the pool bottom and/or at least one of the side walls 6, 7. The rounded element 42 which is rotatable about a vertical axis may be retained, for example, by means of an upper pin 44 and a lower pin 45 inserted through the L-shaped portion 41. The rounded element 43 which is rotatable about a horizontal axis may be retained on the L-shaped portion 41 by means of a cap or plug 46 inserted in the lower end of the L-shaped portion 41. A pin 47 may be inserted in the L-shaped portion 41 adjacent the opposite side of the rotating member 43 to restrict its horizonal movement.

In embodiments of the present invention, a major portion of the side members 10, 11 may be slightly curved, as shown for a curved side member 48 in FIG. 7, to provide a pocket or concave shape to the net 2. The inner curved surface of the net 2 helps to entrap floating and submerged debris when the net is pulled by the handles 17, 18 in a direction as shown by the single-headed arrow in FIG. 7.

In the embodiment of FIG. 8, a handle, such as handle 18, of each side member, such as side member 11, is attached to the side member 11 by string-like elements 49, 50 which extend from the top and bottom portions of the side member 11. This arrangement facilitates maintaining the net 2 in a substantially vertical position as it is moved through the water during a pool cleaning operation. The string-like elements 49, 50 may be secured to the side member or pole 11 by inserting the strings 49, 50 through a hold (not shown) in the side member 11 and tying the free ends into knots 51 and 52.

Preferably, the swimming cleaning pool device of the present invention is moved through the water by persons on opposing sides of the pool in a single pass. The device is preferably held so that a minor portion of the net remains above the surface of the water and a major portion of the net is submerged so as to remove both floating and submerged debris. Debris which is submerged below the bottom edge of the net may be entrapped on a second pass by permitting the device to sink to a lower level.

The mesh or net may, for example, be about 3 feet high and the poles or side members may be about 5 feet high. The length of the net or mesh may be about 5 percent to about 15 percent wider than the width of the pool so that it forms a leaf pocket upon traveling the length of the pool. For example, for a 20-foot wide pool, the net may be rolled out to a width of about 22 feet. After a pool cleaning operation, the net may be rolled up or scrolled about one or both of the side member poles for compact storage.

What is claimed is:

1. A swimming pool cleaner for removing debris from a swimming pool comprising:
    a) a net catching floating and submerged debris in a swimming pool,
    b) a frame upon which said net is mounted, said frame comprising upper and lower substantially horizontal members which are connected to first and second substantially vertical side members,
    c) a weight for maintaining said net in a submerged position while it is moved through water contained within the swimming pool during a pool cleaning operation, and
    d) rounded elements rotatably mounted to said frame to facilitate travel of the net through the water and to protect the pool from damage by the frame.

2. A swimming pool cleaner as claimed in claim 1 wherein the length and flexibility of said net and of said frame are such that they can conform to the pool dimension in a direction perpendicular to the direction of travel of the net through the water, whereby debris may be collected across at least substantially the width of the pool.

3. A swimming pool cleaner as claimed in claim 2 wherein each of said side members has a handle.

4. A swimming pool cleaner as claimed in claim 3 wherein the handle of each side member is attached to the side member by string-like elements extending from the top and bottom portions of the side member to facilitate maintaining the net in a substantially vertical position as it is moved through the water during a pool cleaning operation.

5. A swimming pool cleaner as claimed in claim 4 wherein said upper and lower members of the frame are cord-like, said lower member is non-buoyant, said upper member is buoyant, and said side members are rigid for maintaining said net in an open pocket-like configuration for collecting debris.

6. A swimming pool cleaner as claimed in claim 2 wherein each of said side members has a handle attached to its top via a string-like element so that the net may be pulled through the water by persons on opposing sides of the pool.

7. A swimming pool cleaner as claimed in claim 6 wherein said handles are buoyant balls.

8. A swimming pool cleaner as claimed in claim 1 wherein said rounded elements and said lower frame member comprise said weight for maintaining said net in a substantially vertical and submerged position while it is moved through the water.

9. A swimming pool cleaner as claimed in claim 8 wherein said upper frame member is buoyant.

10. A swimming pool cleaner as claimed in claim 1 wherein said rounded elements are rotatable about said side elements so that upon movement of the net through the water the rounded elements can rotate upon contacting the side walls of the pool.

11. A swimming pool cleaner as claimed in claim 10 wherein said rounded elements are spheres.

12. A swimming pool cleaner as claimed in claim 1 wherein said lower frame member comprises said weight for maintaining said net in a substantially vertical and submerged position while it is moved through the water.

13. A swimming pool cleaner as claimed in claim 1 wherein said first and second side members are curved to impart a concave shape to said net for facilitating entrapment of debris.

14. A buoyant swimming pool cleaner for removing debris from a swimming pool comprising:
 a) a net for catching floating and submerged debris in a swimming pool,
 b) a frame upon which said net is mounted, said frame comprising a buoyant upper member,
 c) a weight for maintaining said net in a submerged position while it is moved through water contained within the swimming pool during a pool cleaning operation, and
 d) rounded elements rotatably mounted to said frame to facilitate travel of the net through the water and to protect the pool from damage by the frame.

15. A swimming pool cleaner as claimed in claim 14 wherein handles are attached to said frame for pulling said net through the water during a pool cleaning operation.

16. A swimming pool cleaner as claimed in claim 14 wherein said rounded elements are rotatable about a horizontal axis so that upon movement of the net through the water the rounded elements can rotate upon contacting the bottom of the pool.

17. A swimming pool cleaner for removing debris from a swimming pool comprising:
 a) a net for catching floating and submerged debris in a swimming pool.
 b) a frame upon which said net is mounted,
 c) a weight for maintaining said net in a submerged position while it is moved through water contained within the swimming pool during a pool cleaning operation, and
 d) rounded elements rotatably mounted to said frame to facilitate travel of the net through the water and to protect the pool from damage by the frame, said rounded elements being rotatably so that upon movement of the net through the water the rounded elements can rotate upon contacting the side walls of the pool.

18. A swimming pool cleaner as claimed in claim 17 wherein said rounded elements comprise said weight for maintaining said net in a substantially vertical and submerged position while it is moved through the water.

19. A swimming pool cleaner for removing floating and submerged debris from a swimming pool comprising a foldable net having upper and lower flexible cord-like members, rigid side members, rounded elements attached to said side members for rotation about a vertical axis so that upon movement of the net through water in the pool during a cleaning operation the rounded elements can rotate upon contacting the side walls of the pool to prevent damage to the pool walls, and handles for pulling the net through the water by persons on opposing sides of the pool.

20. A swimming pool cleaner as claimed in claim 19 wherein said lower flexible cord-like member is a non-buoyant plastic-coated cable, said rounded elements are non-buoyant and rotate about said side members, said handles are buoyant, and said net comprises a plastic material which can be at least partially rolled up about at least one of said side members.

* * * * *